United States Patent Office 3,297,535
Patented Jan. 10, 1967

3,297,535
SHELLAC TABLET COATING COMPOSITIONS
AND METHODS OF PREPARATION
John Allen Butler, Leonardo, N.J., and William Valentine, Nanuet, N.Y., assignors to Hoffman-La Roche Inc., Nutley, N.J., a corporation of New Jersey
No Drawing. Filed Feb. 28, 1963, Ser. No. 261,882
20 Claims. (Cl. 167—82)

This invention relates, in general, to new and improved protective and decorative coatings. More particularly, the invention relates to novel edible coating compositions and the use thereof.

The desirability of applying protective and decorating coatings to pharmaceutical preparations has long been recognized. A pigmented coating is a convenient means of imparting color to a tablet to enhance the attractiveness thereof. Moreover, a coating, if effective, provides a barrier which serves to protect coated pharmaceutical tablets, or components thereof, from the destructive influences of the atmosphere. Additionally, an effective coating can serve to mask any unpleasant or bitter taste that might be characteristic of any component of a tablet.

In recent years, considerable interest has been shown in connection with the problems involving the provision of suitable protective coatings for pharmaceutical tablets. As a result, many and various coating compositions, and procedures for applying same to tablets, are, at present, known in the pharmaceutical art. To a great extent, however, many of the prior art coating compositions, and coating procedures, have not proven to be completely satisfactory. For example, a number of compositions, and/or the procedures by which such compositions are applied, do not afford the ingredients of the tablets, particularly the active drug components thereof, with adequate protection against the destructive influences of the atmosphere. Many of the prior art compositions, and procedures, which do, in fact, furnish such protection, accomplish this chiefly because they are applied to the tablets in a multitude of layers. Obviously, however, this has disadvantages. It unduly increases the size and the weight of the tablet and, oftentimes, it also effects materially the disintegration time of the tablet. However, from a purely practical standpoint, one of the primary objections to the tablet-coating compositions which are presently available in the art is that they are of such a nature that they cannot be quickly and easily applied.

It is the object of this invention to provide improved coating compositions.

A further object of the invention is to provide compositions which, when used to coat pharmaceutical tablets, will protect the ingredients, for example, the active drug components of said tablets, without, at the same time, unduly increasing the weight, size and disintegration time thereof.

A more particular object of the invention is to provide a coating composition which is capable of being applied quickly and easily to tableted products.

Other objects of the invention will be obvious and these will appear hereinafter.

It has now been found that compositions which comprise a mixture of (1) a wetting agent, (2) an opacifying agent, (3) a plasticizer uniformly distributed throughout, (4) an organic solvent solution of a food grade shellac are well suited for use as protective and decorative coatings. Such compositions form continuous, opaque films on the surface of articles treated therewith to provide a coating which is both useful and attractive.

In the most basic embodiment of this invention, an organic solvent solution of a food grade shellac is first prepared. A wetting agent, an opacifying agent and a plasticizer are, thereafter, blended uniformly throughout such solution.

The shellac which is used in producing the present products is a non-toxic, food grade material. This shellac is commonly referred to in the trade as "confectioners glaze." In the practice of this invention, the food grade shellac is employed while dissolved in some suitable inert organic solvent. In general, any medicinally acceptable organic solvent, in which the shellac is soluble, can be used in preparing the solution. Lower molecular weight aliphatic alcohols have been found to be especially well suited for use. Thus, in carrying out the invention, one can use alcohols, such as ethanol, propanol, butanol and isopropanol. Additionally, such alcohols can be used in admixture with each other or with other solvents, such as ethyl acetate. In preparing the preferred products of the invention, either ethyl alcohol or a mixture of isopropanol and ethyl acetate is used as the solvent vehicle for the shellac. While the ratio of isopropanol to ethyl acetate in a mixed solvent system can be varied, it is preferred to employ a solvent mixture comprising from about 75% to 95% of isopropanol and from about 25% to about 5% of ethyl acetate.

The concentration of the shellac solution which is employed in carrying out this invention is not particularly critical. Obviously, in preparing this solution, the amount of solvent which is employed should be sufficient to completely dissolve the shellac. Moreover, a sufficient quantity of solvent should be used to provide the final product in the form of a free-flowing liquid. In general, these objectives are obtained when a solution containing from about 10.0% to about 50.0% by weight of shellac is used in the practice of this invention. A solution containing from about 20% to about 40% shellac is, however, employed in preparing the preferred products of the invention.

In general, one may use any conventional wetting agent in the practice of this invention. Such wetting agent may be anionic, non-ionic or cationic in character. The wetting agent which is employed in the preferred practice of the invention is dioctyl sodium sulfosuccinate. However, wetting agents such as polyoxyethylene glycol sorbitan esters of higher molecular weight fatty acids, for example, polyoxyethylene sorbitan monolaurate, polyoxyethylene sorbitan monostearate, polyoxyethylene sorbitan monooleate, etc., can also be used. Additionally, polyoxyethylene esters or ethers of higher molecular fatty acids, as, for example, polyoxyethylene monooleate, and esters of sorbitol and higher molecular weight fatty acids, such as sorbitan monooleate, can be used as the wetting agent component of the present compositions. Moreover, wetting agents of the quaternary ammonium type, such as cetyl dimethyl benzyl ammonium chloride, can be employed. If desired, mixtures of such wetting agents can be used in preparing the present compositions.

Any conventional prior art opacifying agent can be used in preparing the coating compositions of this invention. In the preferred embodiment of the invention, however, titanium dioxide is employed as the opacifying agent. In lieu of titanium dioxide, iron oxide pigments, carbon black, etc., can be used as the opacifier in the present compositions. Additionally, many of the lake dyes, or any alcohol-soluble dye, or a talc adsorbate, that is, a micronized mixture of talc and dye, can be used as the opacifying agent in the practice of this invention. Mixtures of such opacifying agents can be employed, if desired.

In general, any non-toxic, food grade plasticizing agent, which is soluble in the solvent used in the preparation of the aforementioned shellac solution, can be employed in preparing the present compositions. The invention embodies, also, the use of mixtures of such plasticizing agents. Plasticizing agents which have been found to be particularly well suited for use include, among others, castor oil, diethyl phthalate, ethyl lactate, acetyltriethyl citrate, glyceryl triacetate, etc. Additionally, certain acetylated monoglycerides, as well as certain alkylaryl phosphates, are useful as the plasticizing agents of our compositions. If desired, mixtures of suitable plasticizing agents can be employed. Castor oil is, however, the plasticizer which is used in the formulation of the preferred products of the invention.

The quantities of the essential ingredients which are used in producing the coating compositions of this invention can be varied within rather wide limits. For example, the food grade shellac component may comprise from about 5% to about 40% by weight of the final product. Shellac will, however, comprise from about 10% to about 30% by weight of the preferred products of the invention. The wetting agent, on the other hand, will comprise from about 0.1% to about 2.0% by weight of the final product. The preferred compositions of the invention will contain, however, from about 0.25% to about 1.0% by weight of a wetting agent. The opacifying agent will comprise, broadly, from about 2.0% to about 50.0% by weight of the final product and, preferably, from about 15% to about 30% by weight thereof. The plasticizing agent comprises from about 0.5% to about 5.0% by weight of the final product. The preferred coating compositions of the invention contain, however, from about 0.75% to about 3.0% by weight of a plasticizing agent. The organic solvent will comprise from about 35% to about 70% by weight of the final product. The preferred products of the invention will, however, contain from about 40% to about 65% by weight of the organic solvent.

In addition to the essential ingredients, identified heretofore, the present compositions may contain also certain optional components. For example, it has been found that a form of colloidal silica is advantageously incorporated into our products. The presence of a colloidal silica is particularly useful where titanium dioxide is employed as the opacifier. It should be understood, however, that while a colloidal silica is preferably used in those embodiments of the invention involving the use of titanium dioxide as the opacifying agent, the titanium dioxide-containing products of the invention can be prepared in the absence of the silica. Moreover, it should be understood that the colloidal silica referred to herein can be incorporated into products containing opacifying agents other than titanium dioxide.

The colloidal silica which we employ in the practice of this invention is best characterized as a submicroscopic particulate silica-dioxide prepared in a hot gaseous environment by the vapor phase hydrolysis of a silicon compound. A product of this nature is sold by Cabot Corporation, Boston, Massachusetts, under the trade name "Cab-O-Sil." The latter product, which is used in producing the preferred compositions of the invention, has the following chemical and physical properties:

| | |
|---|---|
| Silica content (moistures-free basis) | 99.0%–99.7%. |
| Free moisture (105° C.) | 0.1%–1.5%. |
| Ignition loss (1000° C.) | 0.2%–1.0%. |
| CaO, MgO | 0.00%. |
| $Fe_2O_3+Al_2O_3$ | 0.01%. |
| Particle size range | 0.015–0.02 micron. |
| Surface area (nitrogen absorption) | 175–200 sq. meter/gram. |
| Specific gravity | 2.1. |
| Color | White. |
| Refractive index | 1.55. |
| pH (4% aqueous dispersion) | 3.5–4.0. |
| Oil absorption (Gardner method) | 150 lbs. oil/100 lbs. pigment. |
| Bulking value | 0.057 gal./lb. |

It will be appreciated, however, that although this embodiment of the invention will be described in the working examples which follow hereinafter with particular reference to the use of "Cab-O-Sil", the invention is not limited to the use of "Cab-O-Sil." Rather, the invention embraces also the use of silica products having properties and characteristics similar to those of "Cab-O-Sil."

Furthermore, the present coating compositions can contain other ingredients, many of which are found in the conventional tablet coating products of the prior art. For example, where it is desired to apply a decorative colored coating to a tablet, any of the various medicinally acceptable coloring agents or dyes can be incorporated in the coating composition. Additionally, finely divided talc may be added to, and blended in, the products. Moreover, suitable flavoring and/or sweetening agents can be incorporated into the products. The use of such optional ingredients, as well as others, will, however, be readily apparent to those skilled in the art. Furthermore, by adjustment of the starting shellac solution with a suitable alkali, such as triethanolamine, to pH 6.5 or higher, one can obtain coating compositions which provide a water-dispersible film.

One of the noteworthy features of the present products is the ease and facility with which they are prepared. In general, the products are obtained merely by uniformly blending the wetting agent, the opacifying agent and the plasticizing agent, with or without the optional ingredients mentioned heretofore, into the solvent solution of the shellac. In a preferred embodiment, the opacifying agent, or a mixture of opacifying agents, is added to the organic solvent solution of shellac. A suitable wetting agent, or mixture of wetting agents, is added to the shellac solution prior to adding the opacifier thereto. Where titanium dioxide is used as the opacifier, it is added to the solution in admixture with from about 0.5% to about 2.0% by weight of colloidal silica. The mixture is agitated until the opacifying agent is uniformly distributed throughout the shellac solution. Where titanium dioxide is used as the opacifying agent, and colloidal silica is not employed, the mixture is blended, for example, by passage through a roller mill. Thereafter, the plasticizer, and the coloring agent, dye, talc, if such are to be used, is charged into, and blended in, the mixture. Preferably, the mixture which is thus obtained is subsequently homogenized by passage through a colloid mill. In another embodiment, the shellac solution can be treated with alkali to adjust its pH to 6.5 or higher prior to blending same with the wetting, opacifying and plasticizing agents. A composition capable of forming a water-dispersible film will be obtained.

In general, the coating composition of this invention can be applied to tablets containing any known drug. Hence, it should be understood that the invention is not limited to the coating of tablets which contain only certain drugs or classes of drugs. Moreover, the invention is not restricted to the coating of tablets produced by any particular procedure or technique. The invention has general application to tablets prepared by usual procedures using conventional ingredients.

The manner in which the present products are used to provide pharmaceutical tablets with effective decorative and protective coatings will be readily apparent to those skilled in the art. Briefly, however, the tablets which are to be coated are placed in a standard coating pan and a sufficient quantity of a product of this invention is poured into the pan to completely wet the tablets. The pan is rotated until all of the coating composition has been absorbed by the tablets. The tablets are then dried with cool air, following which a second coat is applied, in this instance using only that quantity of coating product required to cover the tablets. A third coat and a fourth coat are applied in the same manner as the second coat. Additional coats may be applied if desired. However, it has been found that seldom, if ever, will it be necessary to apply to the tablets more than four coats of the present products. After the coating operation is complete, the tablets are transferred to a polishing pan where they are dusted with a suitable polishing agent, as, for example, powdered carnauba wax.

It has been found that tablets which are coated with the compositions of this invention are provided with a surface film which is characterized by its strength, opaqueness, uniformity and smoothness. This film serves as a barrier which effectively protects the components of the tablets from the destructive influences, that is, light, air and moisture, of the atmosphere. Additionally, such film-coating serves to mask any unpleasant or bitter taste associated with the components of the tablet and greatly decreases the friability of tablet without, however, unduly increasing the weight, size or disintegration time thereof.

One of the most significant aspects of the present invention is the ease and facility with which the results mentioned in the preceding paragraph are obtained. For example, tablets having the outstanding properties referred to heretofore are obtained ordinarily when only four separate coats of the present compositions are applied thereto. This is in dramatic contrast to the prior art where it is not at all uncommon to find that the application of from twelve to eighteen separate coats of the prior art coating compositions to the tablets is an absolute necessity.

While the compositions of this invention find their principal utility in the pharmaceutical field in the coating of tablets containing a medicament, or combinations of medicaments, either alone or in admixture with conventional inert adjuvants, their use is not restricted to that field. For example, the compositions of this invention are useful also in the coating of multivitamin tablets. Additionally, the properties and characteristics of the compositions will be suggestive of other areas, in the drug, food and non-food fields, where these compositions can be employed advantageously.

For a fuller understanding of the nature and objects of this invention, reference may be had to the following examples which are given merely as further illustrations of the invention and are not to be construed in a limiting sense.

*Example 1*

In this example, 170.0 grams of shellac were dissolved in 619.95 grams of ethyl alcohol. Thereafter, 0.05 gram of dioctyl sodium sulfosuccinate, 200.0 grams of titanium dioxide and 10.0 grams of castor oil were incorporated into the solution, with agitation. The mixture, thus obtained, was homogenized by passage through a roller mill.

The liquid composition, which was produced as described in the preceding paragraph, was used to coat pharmaceutical tablets by the procedure as follows: The medicament-containing tablets were placed in a standard coating pan and a sufficient quantity of the coating composition was run into the pan to wet the tablets completely. The pan was rotated continuously until all of the liquid coating composition was taken up by the tablets. The film-coated tablets were then dried by cool air for a period of about 25 minutes.

The second, third and fourth coats were applied in the same manner as the first coat, with care being taken in each coating operation not to over-wet the tablets with the coating composition. After the fourth coat was applied, the pan was allowed to continue rotating until the tablets had lost all of their tackiness and the tablets had begun to take on a glossy appearance. At this point, the tablets were removed from the coating pan and they were placed in a rotating-polishing pan where they were dusted with powdered carnauba wax. Rubbing was continued until tablets of high gloss were obtained.

For the sake of completeness, there is included in the paragraph which follows hereinafter a description of the method of preparation of the tablets which were coated with the coating composition of this example. It should be understood, however, that neither the tablets described herein, nor the method of their preparation, are part of, or a limitation on, the present invention.

In producing the tablets used, the following ingredients, in the quantities hereinafter indicated, were used:

|  | Mg./tablet |
|---|---|
| 5-methyl-3-sulfanilamidoisoxazole | 510 |
| Phenylazo-diamino-pyridine HCl | 102 |
| Cornstarch | 108 |
| Cornstarch (aqueous paste) | 35 |
| Polyvinyl alcohol | 7 |
| Magnesium stearate | 4 |

The tablets were prepared by blending the 5-methyl-3-sulfanilamidoisoxazole and phenylazo-diamino-pyridine hydrochloride with 68 mg./tablet of dry cornstarch. In separate vessels, an aqueous paste containing 35 mg./tablet of cornstarch and an aqueous solution of polyvinyl alcohol were prepared. The cornstarch paste was added to the polyvinyl alcohol solution and the mixture thus obtained was used to prepare a granulate of the mixture of 5-methyl-3-sulfanilamidoisoxazole, phenylazo - diaminopyridine hydrochloride and cornstarch, initially produced. The granulate was dried and ground and thereafter magnesium stearate and 40 mg./tablet of cornstarch was added thereto and mixed therewith. The mixture was tableted using a ½-inch deep, concave punch at a weight of 766 mg.

*Example 2*

In this example, three separate coating compositions were prepared. The method of preparation was the same as that described in Example 1. The formulation for these coating compositions was as follows:

|  | Grams |
|---|---|
| Wetting agent | 0.05 |
| Titanium dioxide | 200.00 |
| Cab-O-Sil | 0.20 |
| Castor oil | 10.00 |
| Shellac | 170.00 |
| Ethyl alcohol | 619.95 |

In the case of the first composition, the wetting agent used was sorbitan monooleate. In the case of the second composition, the wetting agent employed was polyoxyethylene sorbitan monooleate. In the case of the third composition, the wetting agent employed was cetyl dimethyl benzyl ammonium chloride.

Each of these three compositions were evaluated separately for use as tablet-coating compositions by the procedure described in Example 1. In each instance, examination of the coated tablets revealed them to have uniformly excellent surface characteristics.

The tablets which were coated by the coating compositions of this example were produced as follows: 5.1 mg./tablet of 7-chloro-2-methylamino-5-phenyl-3H-1,4-benzodiazepine 4-oxide, 12 mg./tablet of pregelatinized starch, 60.9 mg./tablet of lactose and 40 mg./tablet of cornstarch were milled together following which the mixture was granulated with water and dried. The granulate was ground and 2 mg./tablet of magnesium stearate was added thereto and mixed therewith. The mixture was compressed into tablets using a ¼-inch standard concave punch at a weight of 120 mg.

*Example 3*

In this example, 0.050 gram of dioctyl sodium sulfosuccinate was added to, and dissolved in, a solution of 170.0 grams of shellac in 520.0 grams of an isopropanol-ethyl acetate solvent mixture. The solvent mixture contained 90% by volume of isopropanol and 10% by volume of ethyl acetate. To the mixture, thus obtained, there was added first 250.0 grams of iron oxide pigment and then 50.0 grams of the coloring agent D & C Red No. 28 dispersed in 50 ml. of methanol. Subsequently, 10.0 grams of castor oil was added to, and blended in, the mixture. The mixture was then homogenized by passing same through a colloid mill.

This composition was evaluated for use as a coating for pharmaceutical tablets. The coating procedure employed in this evaluation was the same procedure used and described in Example 1. The tablets which were coated herein were prepared as described in Example 1. It was found that this composition imparted an opaque film to the tablets treated therewith, providing a film coating having excellent surface properties.

*Example 4*

In this example, 1.0 gram of Cab-O-Sil was mixed with 2.5 grams of the coloring agent D & C Red No. 7 (50% dye). Additionally, 1.0 gram of Cab-O-Sil was mixed with 200.0 grams of titanium dioxide. Cab-O-Sil is a trade name for a colloidal silica product marketed by Cabot Corporation, Boston, Massachusetts.

In a separate vessel, 170.0 grams of shellac were dissolved in 466.0 grams of ethyl alcohol. Thereafter, 0.05 gram of dioctyl sodium sulfosuccinate was added thereto. To this solution, there was added the titanium dioxide— Cab-O-Sil mixture and the coloring agent—Cab-O-Sil mixture, described in the preceding paragraph. Subsequently, 150.0 grams of talc and 10.0 grams of castor oil were added to, and blended with, the mixture. The mixture, thus obtained, was homogenized by passage through a colloid mill.

The composition described in the preceding paragraph was evaluated for use as a coating agent for pharmaceutical tablets which were produced as set forth in Example 1. The method of evaluation employed was the procedure described in Example 1. Inspection of the tablets thus treated revealed that they had been imparted with an opaque film with uniformly outstanding surface characteristics.

*Example 5*

This example is included herein to demonstrate the preparation of a highly water-dispersible coating composition.

In this example, 1.0 gram of Cab-O-Sil was mixed intimately with a suitable coloring agent and another 1.0 gram of Cab-O-Sil was mixed with 200.0 grams of titanium dioxide.

In a separate vessel, 0.05 gram of dioctyl sodium sulfosuccinate was added to, and blended with, a solution of 170.0 grams of shellac in 468.0 grams of ethyl alcohol. Prior to the addition of the wetting agent thereto, the shellac solution was adjusted to pH 6.5 by means of the use of triethanolamine. Thereafter, the mixture of the coloring agent and Cab-O-Sil and the mixture of the titanium dioxide and Cab-O-Sil described in the preceding paragraph were added to the shellac solution. The mixture, thus obtained, was stirred well and 150.0 grams of talc and 10.0 grams of castor oil were added thereto. The mixture was then homogenized by passage through a colloid mill.

Tablets, produced as described in Example 1, were coated, using the compositions of this example, by the procedure described in Example 1. There was imparted to the tablets a highly water-dispersible, opaque film coating having outstanding surface characteristics.

*Example 6*

In this example, 1.0 gram of Cab-O-sil was incorporated into, and mixed with, a suitable coloring agent and 1.0 gram of Cab-O-Sil was incorporated into, and mixed with, carbon black (200 grams).

In a separate vessel, a solution was prepared by dissolving 170.0 grams of shellac in 543.0 grams of a mixture of 90% alcohol and 10% of ethyl acetate. To this solution, 0.05 gram of dioctyl sulfosuccinate was added. Thereafter, the mixture of the coloring agent and Cab-O-Sil and the mixture of carbon black and Cab-O-Sil, each of which are described in the preceding paragraph, were added to, and mixed with, the shellac solution. Subsequently, 10.0 grams of diethyl phthalate and 75.0 grams of polyethylene glycol 6000, a glazing agent, were added to the mixture and blended therein. The mixture was then homogenized by passage through a colloid mill.

The composition, thus obtained, was evaluated as a tablet coating agent by the procedure described in Example 1. The tablets used were those prepared as described in Example 2. Examination of the coated tablets revealed that an opaque film had been imparted thereto and that such tablets had uniformly excellent surface characteristics.

*Example 7*

In this example, two separate coating compositions were prepared using, with but two exceptions, the same ingredients, and quantities thereof, as were employed in producing the composition of Example 6. The method described in Example 6 was used also in preparing the compositions of this example.

In producing the present compositions, in one instance 10.0 grams of ethyl lactate was employed as the plasticizing agent in place of the 10.0 grams of diethyl phthalate used in Example 6 and 543.0 grams of isopropyl alcohol was used as the solvent for the shellac. In the second instance, 10.0 grams of acetyltriethyl citrate was used as the plasticizing agent and 543.0 grams of 90% isopropyl alcohol and 10% ethyl acetate was used as the solvent in lieu of the 10.0 grams of diethyl phthalate and 543.0 grams of ethyl alcohol, respectively employed in Example 6.

Each of the two compositions obtained were evaluated for use as coating compositions for pharmaceutical tablets produced as described in Example 2. The coating procedure utilized in this example was the same as that described in Example 1. It was found that each of the two compositions of this example possessed outstanding film-coating properties. Opaque films were imparted to the tablets coated with these compositions and the surface characteristics thereof were uniformly excellent.

Additionally, each of the two compositions of this invention were used to coat multivitamin tablets. Such tablets were prepared in the following manner: A granulation was prepared by granulating a mixture of the following-named ingredients with a solution of 4 mg./tablet of ethyl cellulose in isopropyl alcohol (99%):

| | Mg./tablet |
|---|---|
| Thiamine mononitrate | 3.60 |
| Riboflavin | 2.75 |
| Pyridoxine hydrochloride | 1.10 |
| Niacinamide | 22.00 |

This granulation was dried at a temperature of 120° F.

A second granulation was prepared by dry slugging and subsequently grinding through a No. 30 mesh screen, a mixture of the following-named ingredients:

| | Mg./tablet |
|---|---|
| Ascorbic acid | 65.00 |
| Dicalcium phosphate | 91.19 |
| Vitamin $D_2$ (850,000 $\mu$/gram) | 0.74 |
| Vitamin A acetate (500,000 $\mu$/gram) | 15.00 |
| Cornstarch (dried) | 10.00 |
| Vitamin $B_{12}$ | 0.0125 |
| Calcium stearate | 5.00 |

The first granulation and the second granulation were blended together and compressed at a compression weight of 239 mg. on a $19/64$-inch deep concave punch to provide the desired multi-vitamin tablets. These tablets were, as indicated heretofore, coated with each of the coating compositions of this example. The coating procedure employed was the same as that utilized and described in Example 1.

It was found that the present compositions provided that tablets with a uniform, opaque film coating.

We claim:

1. A composition comprising a homogeneous mixture of from about 5.0% to about 40.0% by weight of shellac, from about 0.1% to about 2.0% by weight of a wetting agent, from about 2.0% to about 50.0% by weight of an opacifying agent, from about 0.5% to about 5.0% by weight of plasticizing agent, and from about 35.0% to about 70.0% by weight of an inert organic solvent in which both the said shellac and said plasticizing agent are soluble.

2. A composition comprising a homogeneous mixture of from about 5.0% to about 40.0% by weight of shellac, from about 0.1% to about 2.0% by weight of dioctyl sodium sulfosuccinate, from about 2.0% to about 50.0% by weight of an opacifying agent, from about 0.5% to about 5.0% by weight of castor oil and from about 35.0% to about 70.0% by weight of an inert organic solvent in which both the said shellac and the said castor oil are soluble.

3. The composition of claim 2 wherein the inert organic solvent present is ethyl alcohol.

4. The composition of claim 2 wherein the inert organic solvent present is isopropyl alcohol.

5. The composition of claim 2 wherein the inert organic solvent present is a mixture of ethyl alcohol and ethyl acetate.

6. The composition of claim 2 wherein the inert organic solvent present is a mixture of isopropyl alcohol and ethyl acetate.

7. The composition of claim 2 wherein the opacifying agent is titanium dioxide and wherein from about 0.5% to about 2.0% by weight of colloidal silica is also present.

8. The composition of claim 2 wherein the opacifying agent present is iron oxide pigment.

9. A composition comprising from about 10.0% to about 30.0% by weight of shellac, from about 0.25% to about 1.0% by weight of wetting agent, from about 15.0% to about 30.0% by weight of an opacifying agent, from about 0.75% to about 3.0% by weight of a plasticizing agent, from about 0.5% to about 2.0% by weight of a colloidal silica and from about 40.0% to about 65.0% by weight of an inert organic solvent in which the said shellac and the said plasticizing agent are soluble.

10. The composition of claim 9 wherein the inert organic solvent present is ethyl alcohol.

11. The composition of claim 9 wherein the inert organic solvent present is a mixture of isopropyl alcohol and ethyl acetate.

12. A composition comprising from about 10.0% to about 30.0% by weight of shellac, from about 0.25% to about 1.0% by weight of dioctyl sodium sulfosuccinate, from about 15.0% to about 30.0% by weight of titanium dioxide, from about 0.75% to about 3.0% by weight of castor oil and from about 40.0% to about 65.0% by weight of an inert organic solvent in which both the said shellac and the said castor oil are soluble.

13. The composition of claim 12 wherein from about 0.5% to about 2.0% by weight of colloidal silica is present.

14. A composition comprising a medicament, in tablet form, coated with a composition comprising a mixture of from about 10.0% to about 30.0% by weight of shellac, from about 0.25% to about 1.0% by weight of a wetting agent, from about 15.0% to about 30.0% by weight of an opacifying agent, from about 0.75% to about 3.0% by weight of a plasticizing agent and from about 40.0% to about 65.0% by weight of an inert organic solvent, in which both the said shellac and the said plasticizing agent are soluble.

15. A composition comprising a medicament, in tablet form, coated with a composition comprising a mixture of from about 10.0% to about 30.0% by weight of shellac, from about 0.25% to about 1.0% of dioctyl sodium sulfosuccinate, from about 15.0% to about 30.0% by weight of titanium dioxide, from about 0.5% to about 2.0% by weight of colloidal silica, from about 0.75% to about 3.0% by weight of castor oil and from about 40.0% to about 65.0% by weight of an inert solvent, said solvent being a solvent by the said shellac and said plasticizing agent.

16. A composition comprising a medicament, in tablet form, coated with a composition comprising a mixture of from about 10.0% to about 30.0% by weight of shellac, from about 0.25% to about 1.0% by weight of dioctyl sodium sulfosuccinate, from about 15.0% to about 30.0% by weight of iron oxide pigment, from about 0.75% to about 3.0% by weight of castor oil and from about 40.0% to about 65.0% by weight of an inert organic solvent in which both the said shellac and the said plasticizing agent are soluble.

17. A method of coating pharmaceutical tablets which comprises contacting a medicament, in tablet form, with a mixture of from about 10.0% to about 30.0% by weight of shellac, from about 0.25% to about 1.0% by weight of a wetting agent, from about 15.0% to about 30.0% by weight of an opacifying agent, from about 0.75% to about 3.0% by weight of a plasticizing agent and from about 40.0% to about 65.0% by weight of an inert organic solvent in which both the said shellac and the said plasticizing agent are soluble.

18. A method of coating pharmaceutical tablets which comprises contacting a medicament, in tablet form, with a mixture of from about 10.0% to about 30.0% by weight of shellac, from about 0.25% to about 1.0% by weight of dioctyl sodium sulfosuccinate, from about 15.0% to about 30.0% by weight of titanium dioxide, from about 0.5% to about 2.0% by weight of colloidal silica, from about 0.75% to about 3.0% by weight of castor oil and from about 40.0% to about 65.0% by weight of an inert organic solvent in which both the said shellac and the said castor oil are soluble.

19. A method of coating pharmaceutical tablets which comprises contacting a medicament, in tablet form, with a mixture of from about 10.0% to about 30.0% by weight of shellac, from about 0.25% to about 1.0% by weight of dioctyl sodium sulfosuccinate, from about 15.0% to about 30.0% by weight of iron oxide pigment, from about 0.75% to about 3.0% by weight of castor oil and from about 40.0% to about 65.0% by weight of an inert organic solvent in which both the said shellac and the said castor oil are soluble.

20. A composition comprising a medicament, in tablet form, coated with a composition comprising a mixture of shellac, an opacifying agent and a plasticizing agent uniformly distributed throughout an organic solvent for the shellac and the plasticizing agent.

References Cited by the Examiner

UNITED STATES PATENTS

| 1,907,203 | 5/1933 | Wruble | 167—82 |
| 2,875,130 | 2/1959 | Grass et al. | 167—82 |
| 2,948,626 | 8/1960 | Sanders | 167—82 |
| 2,954,323 | 9/1960 | Endicott et al. | 167—82 |
| 3,043,747 | 7/1962 | Long | 167—82 |
| 3,173,839 | 3/1965 | Nicholson | 165—82 |

J. S. LEVITT, *Primary Examiner.*

GEORGE A. MENTIS, *Assistant Examiner.*